Feb. 27, 1962 S. RUBINSTEIN ET AL 3,023,267

COMBINATION POWER AND COMMUNICATION CABLE

Filed March 5, 1959

INVENTORS
SOLOMON RUBINSTEIN
OSCAR G. GARNER
BY GEORGE S. EAGER, JR.

Emery, Whittemore, Sandoe & Dix
ATTORNEYS 3,023,267

COMBINATION POWER AND COMMUNICATION CABLE

Solomon Rubinstein, Brooklyn, N.Y., and Oscar G. Garner, Westfield, and George S. Eager, Jr., Upper Montclair, N.J., assignors to General Cable Corporation, New York, N.Y., a corporation of New Jersey Filed Mar. 5, 1959, Ser. No. 797,517
5 Claims. (Cl. 174—115)

This invention relates to electric cables, and more particularly to cables consisting of communication wires and power wires placed together under a common sheath in such manner as to permit both to function properly and safely. Still more specifically, the invention relates to electric power cables in the building wire field which have a telephone or other communication circuit incorporated therein.

It is an object of the invention to provide building wire cables which include a communication circuit, for example, a telephone quad. It also is an object of the invention to provide combination power and telephone cables which are substantially free from mutual interference between the power and the telephone circuits, and which incorporate safety means to protect the telephone equipment and the users thereof against accidental injury from the power circuit, without in any way impairing the operation or the efficiency of either the telephone circuit or the power circuit. Other objects and advantages of the invention will become apparent or will be pointed out as the description proceeds.

It is common practice for telephone companies to run their wires to the instruments separately from the power wires, and these telephone wires commonly take the form of twisted pairs, triplets, or quads. Such wires are used in various locations and are known by a variety of names, e.g. inside-outside station wire, inside station wire, etc. Intercommunication cable between rooms of a house or other building may take similar form and in addition often is shielded to prevent interference. The power wires commonly take the form of nonmetallic sheathed cable, BX armored cable, or wire in conduit.

This use of separate power and telephone wires or cables means that two quite different kinds of wire or cable must be used, each constructed to meet the requirements of mechanical strength and safety as well as the electrical requirements. The result is that there are two separate and independent wiring installations. The need for tensile strength and mechanical protection for both the power and the communication conductors generally necessitate use of considerably more material than would be required simply to provide electrical insulation.

Telephones usually are located in homes and other buildings near an electrical power outlet, if for no other reason than to insure a source of light for using the telephone. If the circuit wires for the telephone and the light could be combined safely and economically into a single cable for such installations, it would require a single wiring installation, rather than the two separate installations of the conventional practice.

The present invention comprises a single cable providing both telephone and power circuits which need be little, if any, larger or more difficult to install than the power cables presently in use. In fact, except for external distinguishing markings, a cable made according to this invention and embodying both power and communication circuits might be made to be practically indistinguishable in external appearance from the power cables currently in use. The use of the cable embodying both power and telephone circuits might be restricted to making wiring connections to locations which are to have telephone outlets, or this cable might be used more widely in place of the conventional building wire, so as to make it a simple matter to have a telephone outlet wherever there is a power outlet, if desired. Each power outlet might comprise an outlet box incorporating a telephone jack as well as the usual electric power outlets.

The present invention combines the power and communication wires into one common cable. It is anticipated that such a cable will have widespread use and may be installed in new homes and other buildings. The cable will be terminated in special outlet boxes which will be built in two sections so that the communication circuit or circuits and the power circuit can be safely reached conveniently at each outlet box. There may be as many as three or four, or more, of these outlets in each room of the house, if desired.

Embodiments of the invention selected for purposes of illustration and description are shown in the accompanying drawings, in which like reference characters indicate corresponding parts in the views, and in which.

Figure 1:
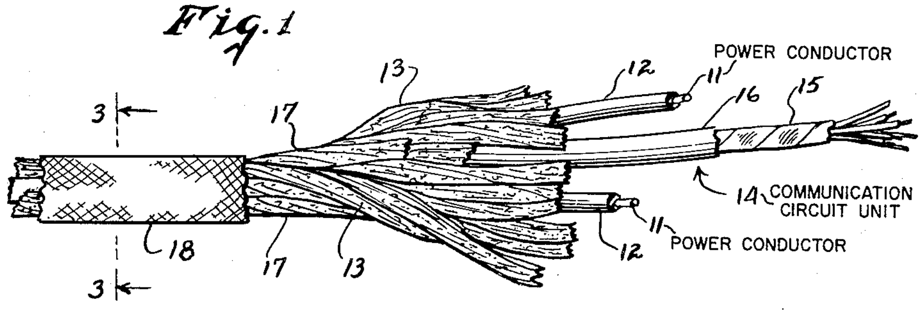
FIG. 1 is a view of a short length of nonmetallic sheathed cable having the ends of the elements progressively cut back and opened to disclose the construction.

Referring to the drawings, FIG. 1 illustrates a nonmetallic sheathed cable having two insulated and mechanically protected power conductors and a shielded and mechanically protected communication circuit unit cabled together in regular helical conformation into an assembly. Each of the two power conductors 11 has a covering 12 of insulation, for example an extruded wall of polyvinyl chloride. For mechanical protection, each of the insulated conductors has a covering 13 consisting, for example, of a plurality of crumpled paper strands wrapped helically over the insulation with a relatively long lay and pressed into a compact wall. The communication circuit unit, indicated generally at 14, comprises communication wires and grounding wires enclosed within a helically wrapped copper tape 15, over which wrapping there is a protective jacket 16, for example an extruded covering of semirigid polyvinyl chloride. The insulated and mechanically protected power conductors and the shielded and mechanically protected communication circuit unit are assembled by being cabled together with a relatively long lay. Preferably, valley fillers 17 of crumpled paper are cabled with the power conductors and the communication circuit unit to give a round contour to the assembly.

Enclosing the assembled conductors and valley fillers is a braided fabric jacket 18, which may be treated with conventional saturating compounds to give moisture resistance and other desired properties. Over the saturating compound will be applied a finishing coat or coats to give to the cable a smooth, non-sticky finish of the desired color. If desired, a bare grounding conductor 19 may be included in the cable during the cabling operation, partially filling one of the valley spaces.

Figure 2:
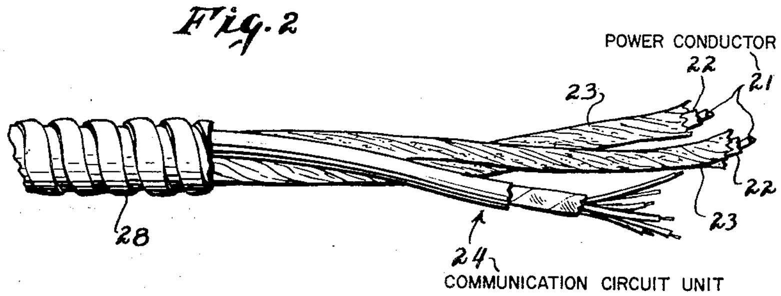
FIG. 2 is a similar view of a BX metal armored cable construction.

FIG. 2 discloses a BX type steel armored cable in which there are two power conductors 21, individually enclosed within walls 22 of insulating material, and provided with protective coverings 23, for example, wrappings of a plurality of crumpled paper strands applied with a long helical lay. The insulated and mechanically protected power wires and a shielded and mechanically protected communication circuit 24 are assembled by being cabled together with a long lay, and the assembly is enclosed within the sheath 28 comprising a helically wrapped steel strip with adjacent edges of the strip overlapping and interengaging each other. The communication circuit unit 24 may be similar to the communication circuit unit 14, and it is so illustrated, or it may differ therefrom, depending on the nature of the communication service for which the cable is intended.

Figures 3, 4, 5:
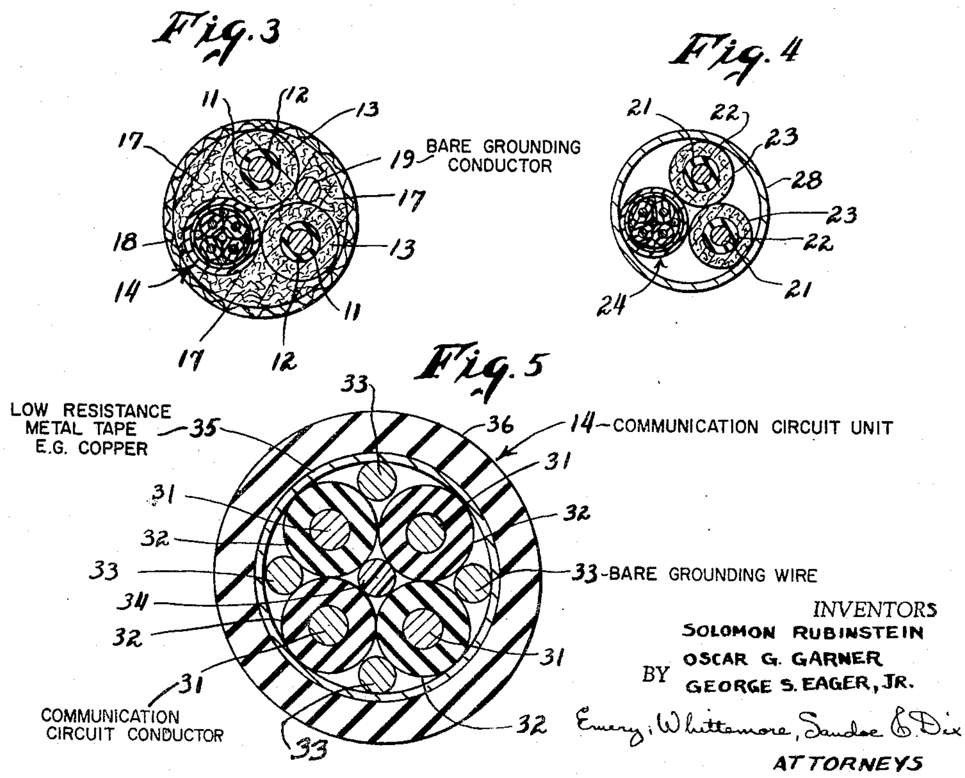
FIG. 3 is an enlarged transverse sectional view through the nonmetallic sheathed cable of FIG. 1.
FIG. 4 is an enlarged transverse sectional view through the metal armored cable shown in FIG. 2.
FIG. 5 is a transverse section to still larger scale through the communication circuit unit shown by way of example in the other figures.

The construction of the illustrative communication circuit unit 14 is shown in detail in FIG. 5, which is a greatly enlarged scale. In this embodiment of a telephone quad there are four communication circuit wires 31, each having a wall 32 of insulation, for example extruded semi-rigid polyvinyl chloride compound. These insulated conductors are assembled by being cabled together with a relatively long lay, and in each of the valleys between the insulated conductors there is positioned a bare grounding conductor 33. The center space between the insulated conductors may be partially or completely filled with a cord 34 of insulating material to assure uniformity in the arrangement of the conductors about the longitudinal axis of the communication unit, and to minimize the possibility of the conductors shifting relative to each other when the cable is bent.

A metal tape 35 of low electrical resistance, for example, a copper tape, is wrapped helically about the assembled communication circuit wires and bare grounding conductors with adjacent turns of the tape overlapping each other, for example, about one-fourth of the width of the tape. This copper tape wrapping provides a continuous shield enclosing the communication circuit wires, and the overlap insures flexibility without danger of opening between tape turns when the cable is bent. The shield will serve to prevent mutual interference between the communication circuits and the adjacent power circuit, and in the event of an accidental failure in the power circuit wires the shield will serve to protect the communication circuit wires against power voltages which might endanger users of the communication system, or might damage communication equipment. The shield may include an overlying steel tape wrapping also as additional means to suppress arcing in the event of a failure in the power conductors. The uninsulated grounding conductors 33 extend the full length of the communication circuit unit and lie directly under and in electrical contact with the shield 35, so as to provide a path of low electrical resistance longitudinally of the communication circuit unit.

For mechanical protection of the shield 35, there desirably is extruded over the shield a jacket 36 of flame retardant material, for example semi-rigid polyvinyl chloride. This jacket will protect the shield against displacement; it will minimize danger of other damage while the communication circuit unit is being assembled with the power circuit conductors; it will further reduce danger of damage to the communication circuit in event of power conductor failure; and it will prevent unwrapping and loosening of the shield at cable joints and outlet boxes.

The sizes of the power and the communication conductors may vary, as may also the number of conductors of both kinds, depending on the service requirements. Preferably, the communication circuit unit is of a size so that it can be conveniently combined with the power conductors to give the appearance of a power cable simply having one additional power conductor.

Merely by way of example, the communication circuit unit may comprise four #22 AWG solid copper wires, each insulated with .015" thick semi-rigid polyvinyl chloride insulation, cabled with four #22 AWG solid copper ground wires in the valleys, as illustrated in FIG. 5. The shield may be a wrapping of .003" thick copper tape applied with a ¼ lap and over this may be a .020" thick extruded jacket of polyvinyl chloride. The over-all diameter of this unit is about .185" and it can be combined, for example, in a two conductor #12 AWG nonmetallic sheathed cable, and the over-all appearance will be that of a three conductor #12 AWG nonmetallic sheathed cable.

It will be understood that the invention may be variously modified and embodied within the scope of the subjoined claims.

What is claimed is:

1. A combined power and communication cable including at least three different conductor units cabled together in regular helical conformation and a common outside sheath enclosing said conductor units, two of the conductor units containing power conductors and each of the power conductors having electrical insulation surrounding it, one of the conductor units containing a plurality of communication conductors, each of which is an independent conductor with its own covering of electrical insulation, the communication conductors being cabled together in regular helical conformation with their coverings of insulation forming valleys between the communication conductors, a helically-wound metal tape wrapped around all of the communication conductors with successive convolutions of the helix overlapping one another and providing a continuous shield against electro-magnetic effects from surges in the power conductors and against actual current flow from a broken and arcing power conductor to the communication conductors, and bare wire conductor means contacting with and electrically connecting successive convolutions of the shield including a ground wire in a valley between the communication conductors and cabled with them to the same regular helical conformation as the communication conductors, the bare ground wire being in substantially continuous contact with the inside surface of the helical convolutions.

2. The combined power and communication cable described in claim 1 and in which there are a plurality of ground wires in the conductor unit containing the communication conductors and each ground wire is in substantially continuous contact with the inside surface of the metal shield, the different ground wires being symmetrically located around the horizontal axis of the conductor unit containing the communication conductors.

3. The combined power and communication cable described in claim 2 and in which there are at least three communication conductors with the surrounding insulations of the communication conductors in contact with each other and with a ground wire in each of the valleys between the communication conductors.

4. The combined power and communication cable described in claim 3 and in which there are four communication conductors symmetrically located about the longitudinal axis of the conductor unit containing the communication conductors, and there are four bare ground wires with one in the valley between every two successive communication conductors, the peripheral surfaces of the insulated communication conductors and of the bare ground wires being tangent to a circumscribed cylindrical surface that constitutes the inside surface of the metal shield.

5. The combined power and communication cable described in claim 4 and in which there is a center cord that holds the communication conductors in their symmetrical relation with one another about the longitudinal axis of the conductor unit containing the communication conductors.

References Cited in the file of this patent

UNITED STATES PATENTS

| | | |
|---|---|---|
| 1,751,143 | Frederickson | Mar. 18, 1930 |
| 1,986,892 | Grimm | Jan. 8, 1935 |
| 2,109,334 | Kaden et al. | Feb. 22, 1938 |
| 2,120,088 | Carlson | June 7, 1938 |
| 2,180,731 | Dickinson | Nov. 21, 1939 |
| 2,663,752 | Wier | Dec. 22, 1953 |

FOREIGN PATENTS

| | | |
|---|---|---|
| 747,693 | Germany | Oct. 16, 1944 |